United States Patent [19]

Narahara et al.

[11] Patent Number: 5,225,012
[45] Date of Patent: Jul. 6, 1993

[54] RADIAL PLY TIRE

[75] Inventors: Yasuhiro Narahara, Kobe; Yukishige Adachi, Akashi, both of Japan

[73] Assignee: Sumitomo Rubber Industries, Ltd., Hyogo, Japan

[21] Appl. No.: 618,996

[22] Filed: Nov. 28, 1990

[30] Foreign Application Priority Data

Nov. 30, 1989 [JP] Japan .................................. 1-312454

[51] Int. Cl.$^5$ ............................................. B60C 9/18
[52] U.S. Cl. ........................................ 152/526; 152/527
[58] Field of Search ................ 152/526, 527, 529, 536

[56] References Cited

U.S. PATENT DOCUMENTS

| | | |
|---|---|---|
| 4,169,495 | 1/1979 | Maiocchi . |
| 4,518,024 | 5/1985 | Matsunuma . |
| 4,526,217 | 7/1985 | Maeda et al. . |
| 4,883,108 | 11/1989 | Takahashi et al. ................ 152/531 |
| 4,890,658 | 1/1990 | Kabe et al. ........................... 152/531 |

FOREIGN PATENT DOCUMENTS

| | | | |
|---|---|---|---|
| 0060210 | 9/1982 | European Pat. Off. ............ | 152/529 |
| 3407874 | 10/1984 | Fed. Rep. of Germany ...... | 152/536 |
| 2081872 | 12/1971 | France ................ | 152/531 |
| 2246404 | 5/1975 | France . | |
| 2393623 | 2/1979 | France . | |
| 1-085381 | 3/1989 | Japan .................. | 152/527 |

*Primary Examiner*—Michael W. Ball
*Assistant Examiner*—Nancy T. Krawczyk
*Attorney, Agent, or Firm*—Birch, Stewart, Kolasch & Birch

[57] ABSTRACT

A radial ply tire with a steel belt, which comprises a carcass ply turned up around bead cores from the axially inside to the outside thereof and a belt comprising two plies of parallel steel cords disposed radially outside the carcass ply in a tread portion of the tire, wherein the amount of steel included in the radially innermost belt ply per an axial unit width and a circumferential unit length there is less than that in the radially outer belt ply disposed on the radially outside of the innermost belt ply.

2 Claims, 1 Drawing Sheet

RADIAL PLY TIRE

BACKGROUND OF THE INVENTION

1. Field of the Invention

The present invention relates to a belted radial ply tire improved in directional stability during straight running.

2. Description of Related Art

When a vehicle provided with radial ply tires is running straight, a phenomenon called "handle pull" is often caused. This phenomenon is such that the actual running direction of the vehicle is leaned toward one side, right or left of the intended straight running direction, which results in an inferior straight running performance.

The main cause of this phenomenon is considered to be a high residual cornering force (CF) of the tires. Here, the residual cornering force is defined as a cornering force at a slip angle at which self aligning torque (SAT) becomes zero.

In the radial ply tires having a higher cornering power (CP), for example radial ply tires provided with a steel cord belt reinforcement, the residual cornering force is likely to be a large value.

In order to decrease the residual cornering force and, thereby, to prevent the "handle pull" phenomenon, it has been employed to decrease the angle of belt cords and to decrease the rigidity of the tread pattern. However, those methods deteriorate dynamic performances of the tire or vehicles.

SUMMARY OF THE INVENTION

It is, therefore, an object of the present invention to provide a radial ply tire, of which residual cornering force is decreased, and whereby the "handle pull" phenomenon can be prevented, without deteriorating the other elements of tire performance.

According to one aspect of the present invention, a radial ply tire comprises a pair of bead cores disposed one in each bead portion of the tire, a radial carcass ply extending between the bead portions and turned up around the bead cores from the axially inside to the outside thereof to be secured thereto, and a belt comprising two plies of parallel steel cords disposed radially outside the carcass ply in a tread portion of the tire, wherein the cross-sectional area of steel included in the radially innermost belt ply per an axial unit width and a circumferential unit length thereof is less than that in the radially outer belt ply disposed on the radially outside of the innermost belt ply.

The above-mentioned steel amount of the innermost belt play is preferably set in the range of from 50 to 98% of the steel amount of the outer belt ply.

Further, in a section, including the tire axis, of the outer belt ply, the total of the sectional areas of the steel cords is preferably set in the range of 7 to 14 sq. mm per 50 mm width.

DETAILED DESCRIPTION OF THE PREFERRED EMBODIMENTS

Figure 1:
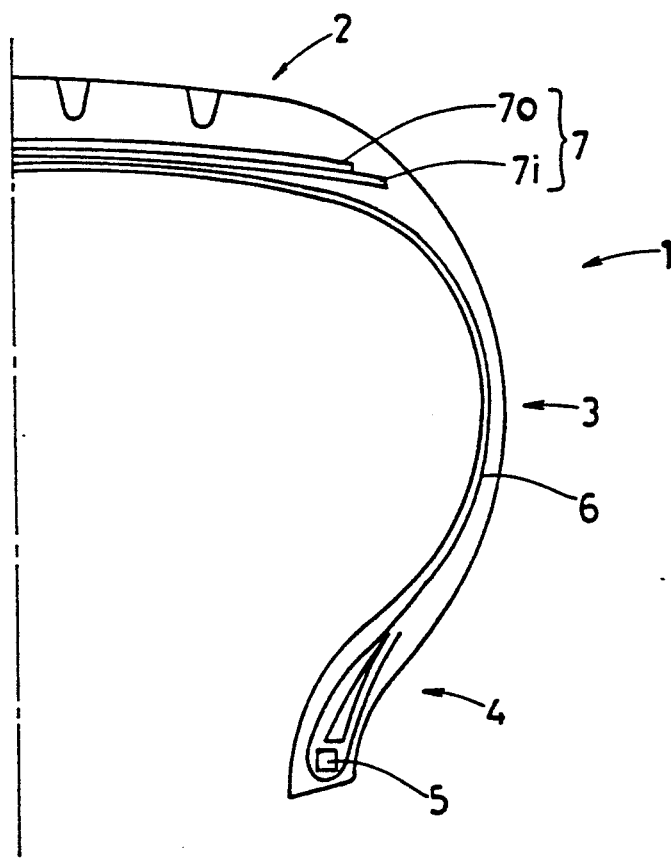
FIG. 1 is a sectional view showing a right half of a radial ply tire according to the present invention.

The radial ply tire 1 has a tread portion 2, a pair of bead portions 4, and a pair of sidewall portions 3 extending between the tread edges and the bead portions.

The tire comprises a pair of bead cores 5 disposed one in each of the bead portions 4, a radial carcass 6 composed of at least one ply of radially arranged cords turned up around the bead cores from the axially inside to outside thereof, a rubber tread disposed radially outside the carcass, and a belt 7 disposed radially outside the carcass and inside the tread.

For the carcass 6, steel cords or organic fiber cord, e.g. polyester, nylon, aromatic polyamide and the like, are used.

The belt 7 is composed of two piles 7o and 7i of parallel steel cords coated with topping rubber. However, one or more additional plies can be included therein.

The belt plies 7o and 7i extend continuously across the tread portion, and the radially innermost belt ply 7i is disposed on the crown of the carcass, and the radially outer belt ply 7o is disposed on the outside of the belt ply 7i.

The steel cords in each belt ply are laid parallel with each other at a small angle of 10 to 30 degrees with respect to the tire circumferential direction but crosswise to the steel cords in the next ply.

Here, the cross-sectional area of steel included in the inner belt ply 7i is set to be less than the cross-sectional area of steel included in the outer belt ply 7o regardless of the cord thickness, the cord structure, the cord count, the cord angle and the like. That is, the thickness and structure of the belt cords, the cord count for each belt ply, and the like are arranged to satisfy the following conditions: in a tire axial section including the tire axis, the total of the sectional areas of the steel cords included in the inner belt ply 7i per a unit width is set smaller than the total of the cross-sectional areas of the steel cords included in the outer belt ply 7o per the same unit width; the total in the outer belt ply 7o is set in the range of 7 to 14.0 sq. mm per a width of 50 mm measured along the ply; and the total in the inner belt ply 7i is 50 to 98%, more preferably 50 to 95%, still more preferably 50 to 90% of the total in the outer belt ply 7o.

In this case, therefore, the cross-sectional area of steel in the belt is decreased in comparison with a case that the same plies are used, and the residual cornering force is decreased. As a result, the "handle pull" phenomenon can be prevented. However, a decrease in the cornering power is controlled at the cross-sectional area of steel same time since the steel in the inner belt ply 7i which has a less relation to the cornering power is decreased, and the cross-sectional area of steel in the outer belt ply 7o which has a close relation to the cornering power is maintained.

Furthermore, there was found a fact that it is effective on the decrease in residual cornering force to provide a difference in the cross-sectional areas of steel between the plies 7o and 7i as well as to decrease the total of the cross-sectional area of steel.

When the above-mentioned total sectional area of the outer belt ply cords is less than 7 sq. mm, the belt can not be provided with a necessary rigidity. On the other hand, when it is more than 14.0 sq. mm, the stiffness of the belt is excessively increased, which impairs ride comfort.

When the above-mentioned percentage exceeds 98%, there is substantially no difference therebetween, and the above-mentioned object can not achieved. On the other hand, when it is less than 50%, the belt can not have a necessary circumferential rigidity because this rigidity is achieved by the cross cord arrangement of the belt plies.

According to specifications given in the following Table 1, test tires of size P155/80R13 were made and tested for cornering power CP and residual cornering force CF.

TABLE 1

|  | Ex. | Ref.1 | Ref.2 |
|---|---|---|---|
| Carcass |  |  |  |
| Cord material | polyester | polyester | polyester |
| Belt |  |  |  |
| Outer ply 7i |  |  |  |
| Width (mm) | 100 | 100 | 100 |
| Cord angle (deg.) | 19 | 19 | 19 |
| Cord count/5 cm | 37 | 37 | 40 |
| Cord structure | 1 × 5/0.23 | 1 × 5/0.23 | 1 × 4/0.22 |
| Total section area (sq. mm) | 7.88 | 7.88 | 6.07 |
| Inner ply 7o |  |  |  |
| Width (mm) | 114 | 114 | 114 |
| Cord angle (deg.) | 19 | 19 | 19 |
| Cord count/5 cm | 40 | 37 | 40 |
| Cord structure | 1 × 4/0.22 | 1 × 5/0.23 | 1 × 4/0.22 |
| Total section area (sq. mm) | 6.07 | 7.68 | 6.07 |
| (percentage to that of outer ply) | (79%) | (100%) | (100%) |
| Cornering power (kgf/deg.) | 75.5 | 76.8 | 74.9 |
| Residual cornering force (kgf) | 2.76 | 4.66 | 3.90 |

In the working example tire, the percentage of the total cross-sectional area of steel in the outer belt ply to that in the innermost belt ply was set at 79%.

In each of the reference tires 1 and 2, the outer and inner belt plies had the same total cross-sectional area of steel, but the belt plies with the higher total cross-sectional area of steel were used in the reference tire 1, and contrast, the belt plies with the lower total cross-sectional area of steel were used in the reference tire 2.

In the tests, cornering power CP and residual cornering force CF were measured with an indoor drum tester under the following test conditions: Inner air pressure of 2.0 kg/sq. cm; and Tire load of 327 kgf.

The working example tire could be greatly decreased in the residual cornering force CF, but the decrease in the cornering power CP was less.

As described above, in the radial tire according to the present invention, the total cross-sectional area of steel included in the inner belt ply is set to be less than that in the outer belt ply. As a result, the residual cornering force is greatly reduced, and the "handle pull" phenomenon can be effectively prevented.

We claim:

1. A radial ply tire comprising:
   a pair of bead portions;
   a pair of bead cores, one of said bead cores being disposed in each of said pair of bead portions;
   a radial carcass including at least one ply and extending between said pair of bead portions and turned up around each of said pair of bead cores from the axially inside to the outside thereof to be secured thereto;
   a tread portion; and
   a belt comprising only two plies of a radially inner ply and a radially outer ply, each said ply having parallel steel cords, each said ply being disposed radially outside said carcass ply in said tread portion,
   wherein the total cross-sectional area of the steel cords included in said inner ply per an axial unit width thereof is preferably set in the range of from 50 to 98% of the total cross-sectional area of the steel cords per an axial unit width thereof within said outer ply.

2. The radial ply tire according to claim 1, wherein in a section, including the tire axis, of said outer ply, the total of the sectional areas of the steel cords is preferably set in the range of 7 to 14 sq. mm per 50 mm width.

* * * * *